United States Patent
Hoang et al.

(10) Patent No.: US 10,533,667 B2
(45) Date of Patent: Jan. 14, 2020

(54) SHEARING GATE VALVE SYSTEM

(71) Applicant: Cameron International Corporation, Houston, TX (US)

(72) Inventors: Loc Hoang, Houston, TX (US); Julian Miguel Pilares, Houston, TX (US); Samuel Laurence Taylor, Houston, TX (US)

(73) Assignee: Cameron International Corporation, Houston, TX (US)

( * ) Notice: Subject to any disclaimer, the term of this patent is extended or adjusted under 35 U.S.C. 154(b) by 47 days.

(21) Appl. No.: 15/135,131

(22) Filed: Apr. 21, 2016

(65) Prior Publication Data

US 2016/0312904 A1    Oct. 27, 2016

Related U.S. Application Data

(60) Provisional application No. 62/152,682, filed on Apr. 24, 2015.

(51) Int. Cl.
*F16K 3/02* (2006.01)
*E21B 33/06* (2006.01)
*F16K 3/30* (2006.01)

(52) U.S. Cl.
CPC .......... *F16K 3/0281* (2013.01); *E21B 33/063* (2013.01); *F16K 3/30* (2013.01)

(58) Field of Classification Search
None
See application file for complete search history.

(56) References Cited

U.S. PATENT DOCUMENTS

| 2,985,422 | A | * | 5/1961 | Anderson | F16K 3/0227 251/172 |
|---|---|---|---|---|---|
| 3,223,100 | A | | 12/1965 | Koenig et al. | |
| 3,716,068 | A | | 2/1973 | Addison | |
| 3,766,978 | A | | 10/1973 | Orund et al. | |
| 4,215,749 | A | | 8/1980 | Dare et al. | |
| 4,347,898 | A | | 9/1982 | Jones | |
| 4,531,585 | A | | 7/1985 | Hansen | |
| 4,612,983 | A | | 9/1986 | Karr, Jr. | |
| 4,911,410 | A | | 3/1990 | Baker | |

(Continued)

FOREIGN PATENT DOCUMENTS

| WO | 2014/144332 A2 | 9/2014 |
|---|---|---|
| WO | 2014/144792 A2 | 9/2014 |

OTHER PUBLICATIONS

International Search Report and Written Opinion for PCT Application No. PCT/US2013/034173 dated May 13, 2014, 15 pgs.

(Continued)

*Primary Examiner* — Jessica Cahill
*Assistant Examiner* — Daphne M Barry
(74) *Attorney, Agent, or Firm* — Fletcher Yoder, P.C.

(57) ABSTRACT

A system including a shearing gate valve system including a shearing gate valve including a flow control element configured to move axially and block a flow of fluid through the shearing gate valve, a cutting blade coupled to the flow control element and configured to shear a tubular, a first seat configured to form a seal with the flow control element to block the flow of fluid, and a second seat with an open end configured to block the shearing gate valve from shearing the tubular member at two locations.

17 Claims, 8 Drawing Sheets

(56) References Cited

U.S. PATENT DOCUMENTS

| | | | |
|---|---|---|---|
| 5,199,493 A * | 4/1993 | Sodder, Jr. | E21B 29/08 166/297 |
| 5,501,424 A | 3/1996 | Williams et al. | |
| 5,803,431 A | 9/1998 | Hoang et al. | |
| 6,244,336 B1 | 6/2001 | Kachich | |
| 6,289,992 B1 | 9/2001 | Monjure et al. | |
| 6,454,015 B1 | 9/2002 | Armstrong et al. | |
| 6,598,849 B2 | 7/2003 | Hoang et al. | |
| 6,601,650 B2 * | 8/2003 | Sundararajan | E21B 33/063 166/361 |
| 8,070,131 B2 | 12/2011 | Liew | |
| 8,353,338 B2 | 1/2013 | Edwards | |
| 8,567,490 B2 * | 10/2013 | Van Winkle | E21B 33/063 166/85.4 |
| 8,714,263 B2 | 5/2014 | Sundararajan et al. | |
| 9,097,082 B2 | 8/2015 | Hoang | |
| 9,249,643 B2 * | 2/2016 | Melancon | E21B 33/063 |
| 2003/0029619 A1 | 2/2003 | Sundararajan | |
| 2010/0071913 A1 * | 3/2010 | Edwards | F16K 3/029 166/316 |
| 2010/0319906 A1 | 12/2010 | Van Winkle | |
| 2013/0119288 A1 | 5/2013 | Shaw | |
| 2014/0110611 A1 * | 4/2014 | McClanahan | E21B 33/063 251/1.3 |
| 2014/0231090 A1 | 8/2014 | Sundararajan et al. | |
| 2014/0264099 A1 * | 9/2014 | Melancon | E21B 33/063 251/1.1 |
| 2016/0032676 A1 * | 2/2016 | Malone | E21B 29/08 166/298 |
| 2016/0032679 A1 | 2/2016 | Hoang | |

OTHER PUBLICATIONS

PCT International Search Report & Written Opinion; Application No. PCT/US2016/028838; dated Sep. 19, 2016; 13 Pages.

* cited by examiner

SHEARING GATE VALVE SYSTEM

CROSS-REFERENCE TO RELATED APPLICATION

This application claims benefit of U.S. Provisional Patent Application No. 62/152,682, filed Apr. 24, 2015, entitled "SHEARING GATE VALVE SYSTEM," which is incorporated by reference herein in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Gate valves are used in a variety of applications to control the flow of fluids. Gate valves generally include an open position that enables fluid flow and a closed position that reduces or completely shuts off fluid flow. In certain applications, a wireline or tubing may obstruct closure of the gate valve. Accordingly, some systems may use a shearing gate valve to cut the wireline or tubing in order to close. Unfortunately, as the shearing gate valve closes it cuts the wireline or tubing in two places forming a slug. Moreover, a significant amount of force may be used to cut the wireline or tubing in two places.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments relate generally to flow control equipment for wellbores. When drilling for or producing hydrocarbons, it is advantageous to prevent the release of wellbore fluids and pressures to the environment in an uncontrolled manner. Most wells employ numerous valves (e.g., gate valves, blowout preventers, ball valves, etc.) to control wellbore fluids. These valves generally operate by sealing off a flow path to prevent the flow of fluid from one side of the valve to the other.

When using a gate valve, for example, an obstruction in the flow path may hinder the valve's operation. A wireline, tubing, or coiled tubing that has been placed in the well for maintenance work on the well, for instance, may obstruct the valve's gate from moving to the closed position. The embodiments discussed below describe shearing gate valve systems capable of shearing through a tubular (e.g., wireline, tubing, etc.) or other obstruction. Instead of shearing the tubular twice at separate locations/places, the described shearing gate valve system only shears the tubular once at one location. This reduces the force needed to cut the tubular. Indeed, the shearing gate valve system may shear the tubular with half the force because only a single cut is made. Therefore, since the gate valve's motive force is focused on one location, the shearing gate valve system may be able to shear thicker and/or stronger tubular. Moreover, by cutting the tubular one time, the shearing gate valve system does not form a slug (e.g., a separate piece of the tubular formed by cutting the tubular in two axial locations).

Figure 1:
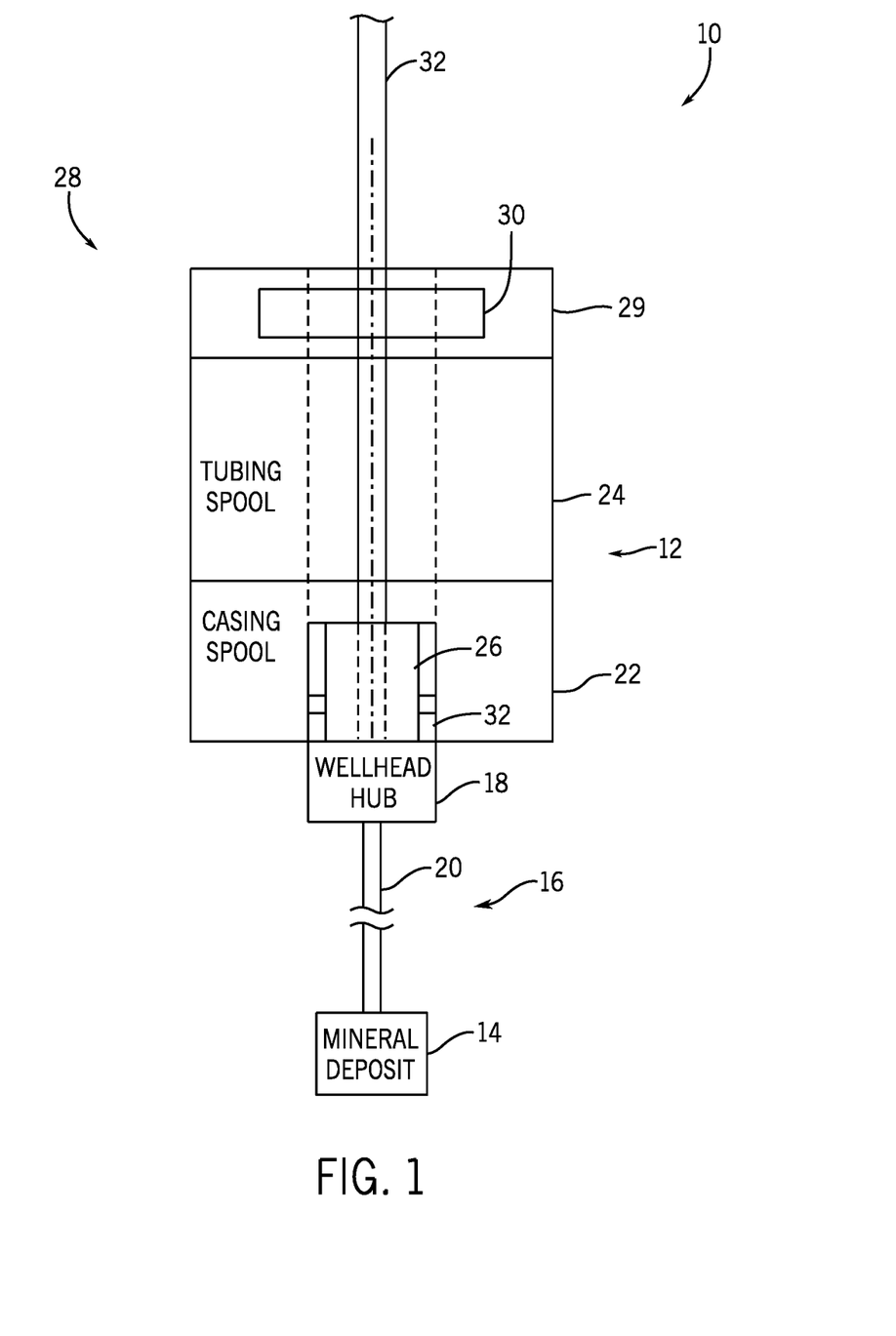
FIG. 1 is a block diagram of an embodiment of a hydrocarbon extraction system with a shearing gate valve system.

FIG. 1 is a block diagram that illustrates a hydrocarbon extraction system 10 according to an embodiment. In operation, the hydrocarbon extraction system 10 extracts various minerals and natural resources, including hydrocarbons (e.g., oil and/or natural gas). In some embodiments, the hydrocarbon extraction system 10 is land-based (e.g., a surface system) or subsea (e.g., a subsea system). As illustrated, the hydrocarbon extraction system 10 includes a wellhead 12 coupled to a mineral deposit 14 via a well 16, wherein the well 16 includes a wellhead hub 18 and a well-bore 20.

The wellhead hub 18 generally includes a large diameter hub that is disposed at the termination of the well-bore 20. The wellhead hub 18 provides for the connection of the wellhead 12 to the well 16. The wellhead 12 typically includes multiple components that control and regulate activities and conditions associated with the well 16. For example, the wellhead 12 includes a spool 22 (e.g., tubular), a tubing spool 24 (e.g., tubular), a hanger 26 (e.g., a tubing hanger or a casing hanger). The extraction system may also include a flow control device 29, such as a "Christmas tree," a blowout preventer 28, a light intervention package, a choke assembly, to name but a few.

In some embodiments, the flow control device 29 includes a shearing gate valve system 30 capable of shearing through a tubular 32 (e.g., wireline and/or tubing, drill collar) to seal the wellbore and block the escape of hydrocarbons. For example, in certain embodiments, the shearing gate valve system may be part of the intervention package that can be mounted to the extraction system 10 as a flow control device 29. The intervention package facilitates maintenance or testing on the well. For example, the intervention package can be used to inject fluids into the well to boost hydrocarbon production. The intervention package may be of reduced weight or "light" so that it can deployed to the seafloor with a smaller vessel than is required for large flow control devices. In other embodiments, the shearing gate valve may be employed as part of a blowout preventer.

Figure 2:
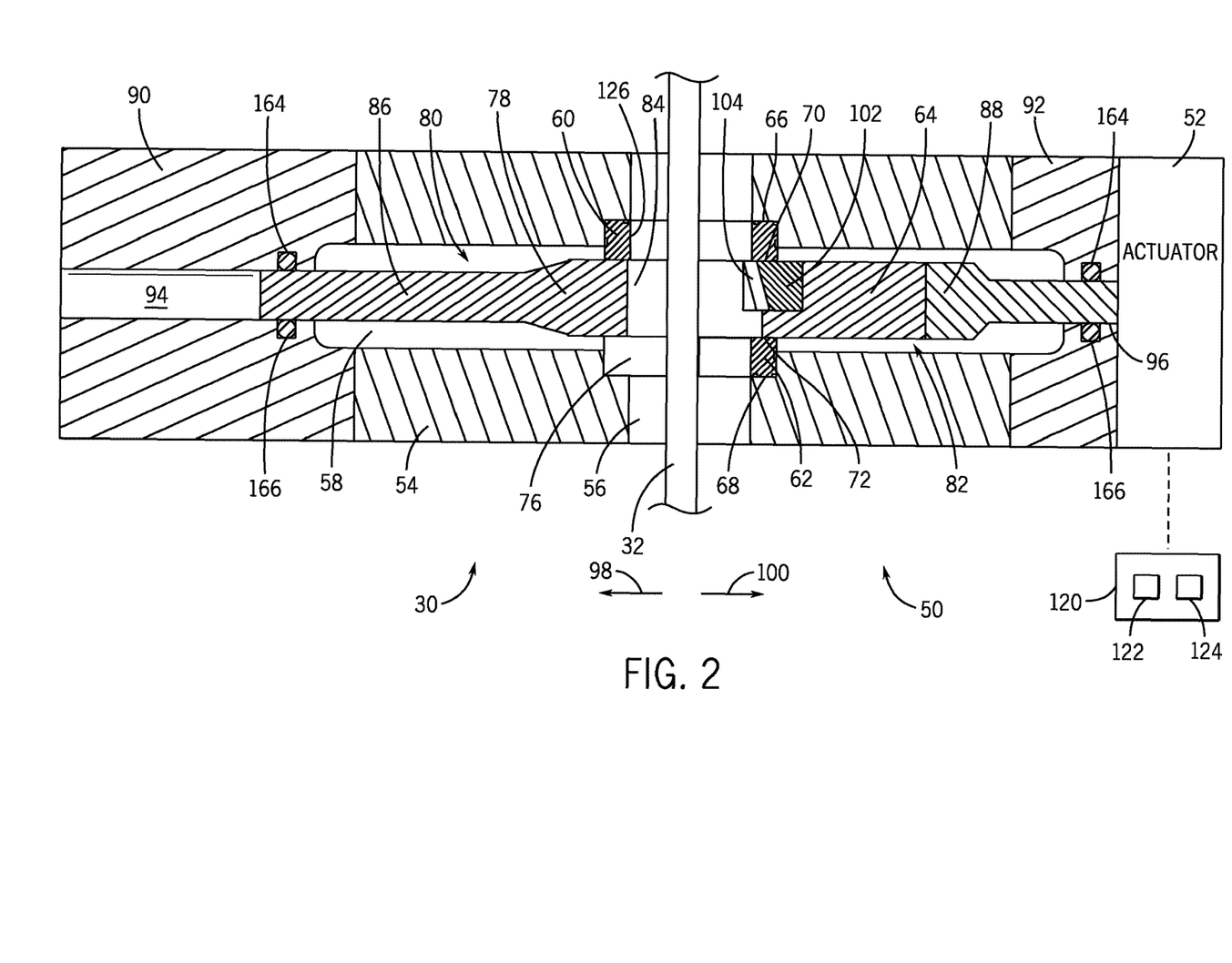
FIG. 2 is a cross-sectional view of an embodiment of a shearing gate valve system in an open position.

FIG. 2 is a cross-sectional view of an embodiment of a shearing gate valve system 30 in an open position. As explained above, the gate valve system 30 can shear or cut the tubular 32 with less force by cutting the tubular 32 at one axial location, instead of two axial locations. In other words, the shearing gate valve system 30 is able to cut the tubular 32 with half the force by cutting the tubular 32 once instead of twice. Accordingly, the shearing gate valve system 30 may shear a thicker and/or stronger tubular 32, in the hydrocarbon system 10. Moreover, by cutting the tubular 32 one time, the shearing gate valve system 30 does not form a slug (e.g., a separate piece of the wireline or tubular 32 formed by cutting the tubular 32 in two axial locations).

As illustrated, the shearing gate valve system 30 includes a shearing gate valve 50 that couples to an actuator 52. The shearing gate valve 50 includes a valve body 54 with a passage 56 (e.g., bore) that enables a tubular 32 to pass through the shearing gate valve 50 and into the well 16. As illustrated, the passage 56 fluidly communicates with a cavity 58 that houses a first seat 60, a second seat 62, and a flow control element 64 (e.g., gate). The first and second seats 60, 62 rest within respective first and second counterbores 66, 68 of the cavity 58 and contact opposite axial surfaces 70 and 72 of the flow control element 64. In some embodiments, the first seat 60 is a closed seat (e.g., annular seat) that enables the first seat 60 to form a seal around the passage 56 with the flow control element 64. In contrast, the second seat 62 may be an open seat with an open end 76. As will be explained below, the open end 76 of the second seat 62 enables the shearing gate valve system 30 to shear the tubular 32 only once.

The flow control element 64 includes a flow control element body 78 with a first end 80, a second end 82, and an aperture 84. As illustrated, the aperture 84 enables the tubular 32 to pass through the flow control element 64. Coupled to the respective first and second ends 80, 82 are stems 86 and 88 (e.g., shafts, rods). In some embodiments, the shearing gate valve 50 may not include the stem 86. The stems 86 and 88 may be part of the flow control element body 78 (e.g., integral, one-piece) or separate components that attach to the first and second ends 80, 82. For example, in some embodiments, the stems 86, 88 and/or the body 78 of the flow control element 64 may be separate components that are mechanically coupled to one another (e.g., via threaded interface, t-slot, lift nut, or the like). In operation, the stems 86, 88, and seats 60, 62 suspend and guide the flow control element 64 within the cavity 58. The stems may be pressure balanced on opposite sides, such that the fluid pressure is applied to both stems, but it is also envisaged that the described shearing gate valve 50 may be employed in gate valves where there is no pressure balancing.

The shearing gate valve 50 may include a first and second bonnets 90, 92 that couple to the valve body 54. In some embodiments, the valve body 54 may include integral ends or bonnets 90, 92 (e.g., the bonnets 90, 92 and valve body 54 form one-piece). The bonnets 90, 92 include respective apertures 94, 96 that receive and guide the stems 86, 88. In other words, the apertures 94, 96 may block lateral movement of the stems 86, 88 while enabling the flow control element 64 to move axially in directions 98 and 100.

In order to cut the tubular 32, the flow control element 64 includes a blade 102 with a cutting edge 104 (e.g., knifeedge). The blade 102 may be part of the flow control element body 78 (e.g., integral, one-piece) or a separate component that couples to the flow control element body 78. For example, the blade 102 may be a blade insert. In some embodiments, the blade 102 may be a made out of a different material than that of the flow control element body 78 (e.g., tougher metal, carbide, ceramic, etc.), and may include a coating that facilitates cutting (e.g., carbide, ceramic).

Figure 3:
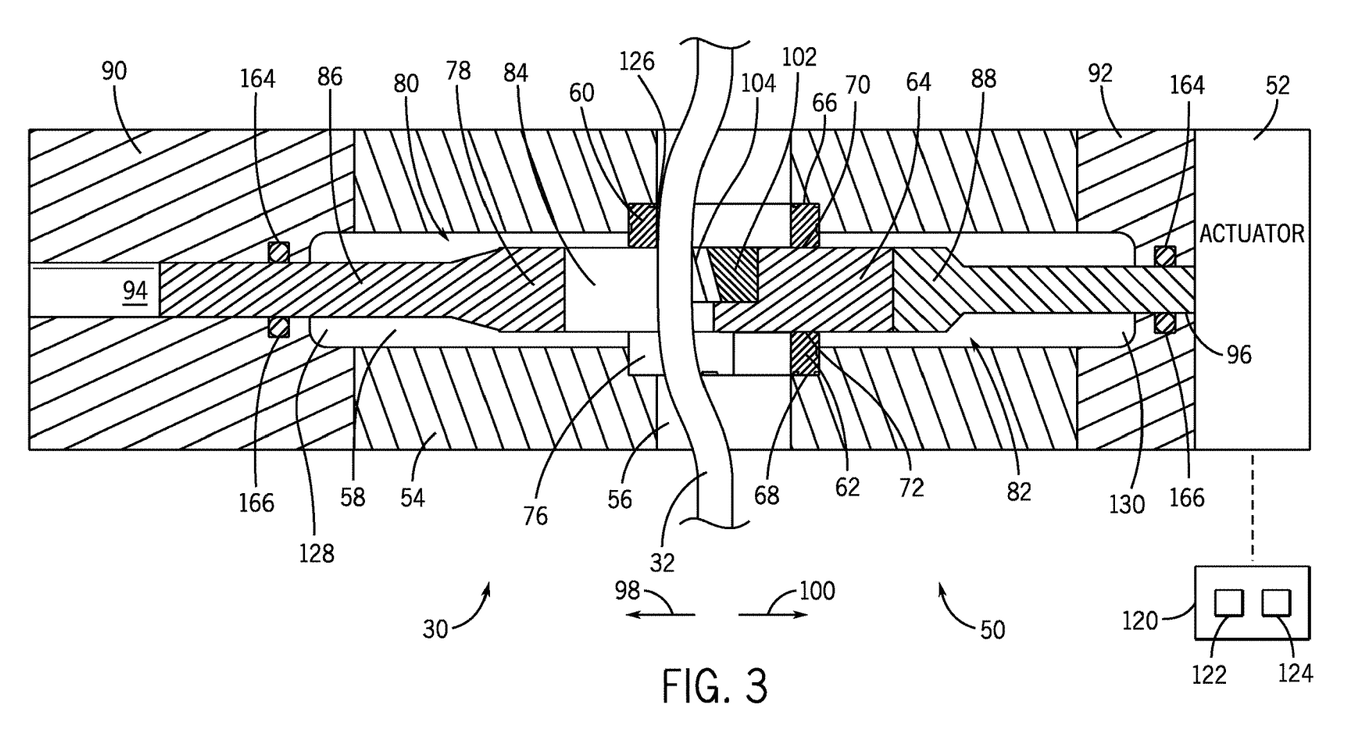
FIG. 3 is a cross-sectional view of an embodiment of a shearing gate valve system in a shearing position.

FIG. 3 is a cross-sectional view of an embodiment of a shearing gate valve system 30 in a shearing position. As illustrated, the actuator 52 couples to a controller 120. The controller 120 includes a processor 122 that executes instructions stored on a memory 124 to control operation of the actuator 52. For example, during operating the hydrocarbon extraction system 10 may experience a "kick" or another flow control event. In response, the controller 120 blocks the flow of hydrocarbons by shutting the shearing gate valve 50. In order to close the shearing gate valve 50, the actuator 52 drives the stem 88 in axial direction 98. As the stem 88 moves in axial direction 98, the blade 102 contacts the tubular 32 compressing the tubular 32 against an interior surface 126 of the first seat 60.

Figure 4:
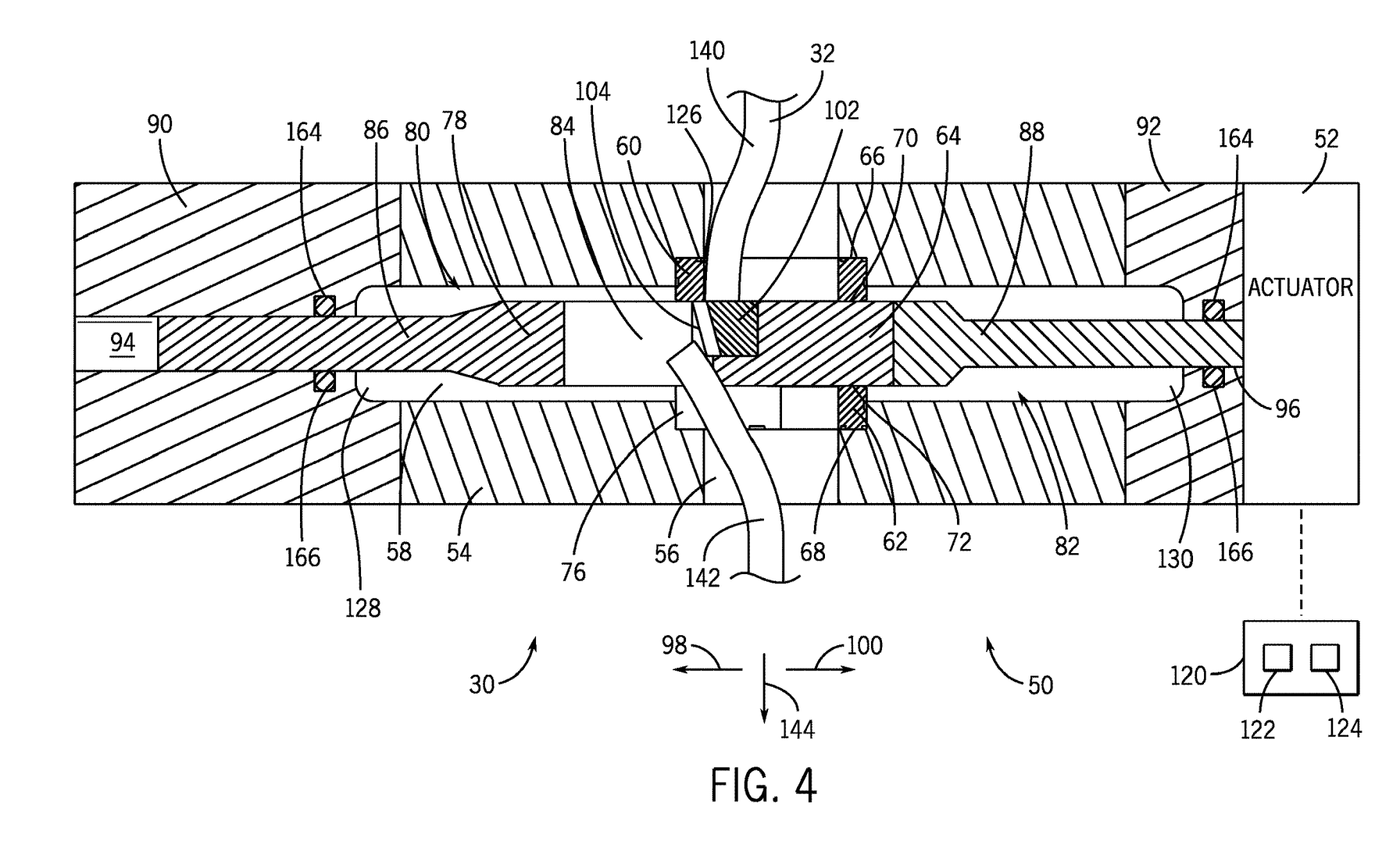
FIG. 4 is a cross-sectional view of an embodiment of a shearing gate valve system in a shearing position.

FIG. 4 is a cross-sectional view of an embodiment of a shearing gate valve system 30 shearing through a tubular 32. After compressing the tubular 32 against the interior surface 126 of the first seat 60, the actuator 52 continues to drive the flow control element 64 in direction 98. The blade edge 104 then shears through the tubular 32 along the top surface 70 of the flow control element 64. As the blade 102 shears through the tubular 32, the flow control element 64 forms a first tubing piece 140 and a second tubing piece 142. As explained above, the second seat 62 (e.g., open seat) has the open end 76. Accordingly, neither the blade 102 nor the flow control element body 78 compress and shear the second tubing piece 142 against the second seat 62. After cutting the tubular 32, the first tubing piece 140 is no longer able to support the second tubing piece 142. The second tubing piece 142 therefore falls into the wellhead 12 in axial direction 144, which prevents a second cut of the tubular 32.

Figure 5:
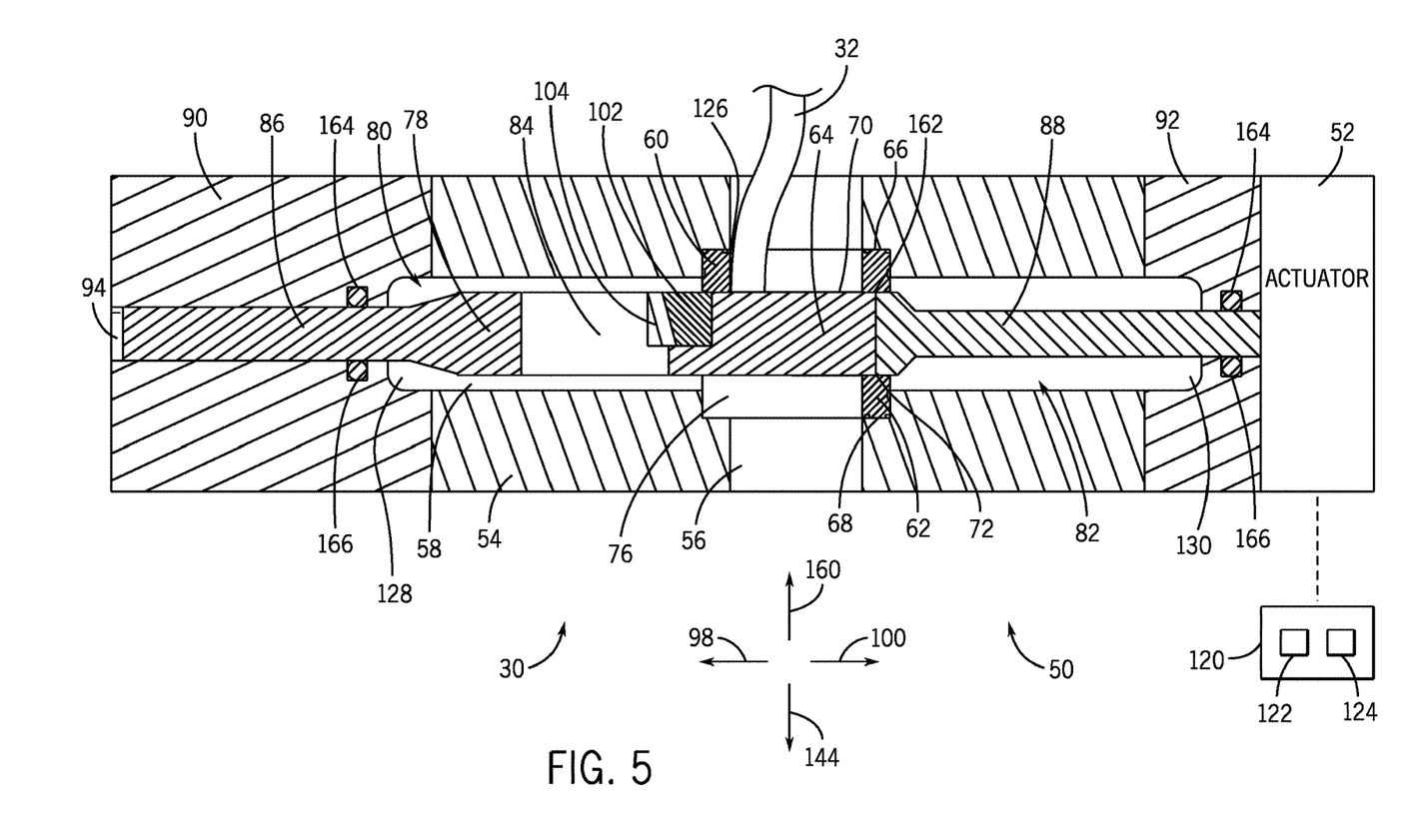
FIG. 5 is a cross-sectional view of an embodiment of a shearing gate valve system in a closed position.

FIG. 5 is a cross-sectional view of an embodiment of a shearing gate valve system 30 in a closed position. After shearing through the tube 32, the actuator 52 continues to drive the flow control element 64 in axial direction 98 until the flow control element 64 covers the passage 56. Once sheared, the pressure within the well 12 drives the flow control element 64 in axial direction 160 compressing the top surface 70 of the flow control element 64 against the bottom surface 162 of the second seat 62, which forms a seal. In this position, the flow control element 64 blocks fluid flow through the shearing gate valve 50. In order to block fluid flow out of the cavity 58, the shearing gate valve 50 may include one or more annular grooves 164 (e.g., 1, 2, 3, 4, 5, or more) in the bonnets 90, 92 that receive seals 166 (e.g., annular seals). In operation, the seals 166 contact and seal with the stems 86 and 88 blocking fluid flow out of the bonnets 90, 92. In some embodiments, the shearing gate valve 50 may include seals in counterbores 128, 130 of the respective bonnets 90, 92 that likewise block fluid flow out of the bonnets 90, 92.

Figure 6:
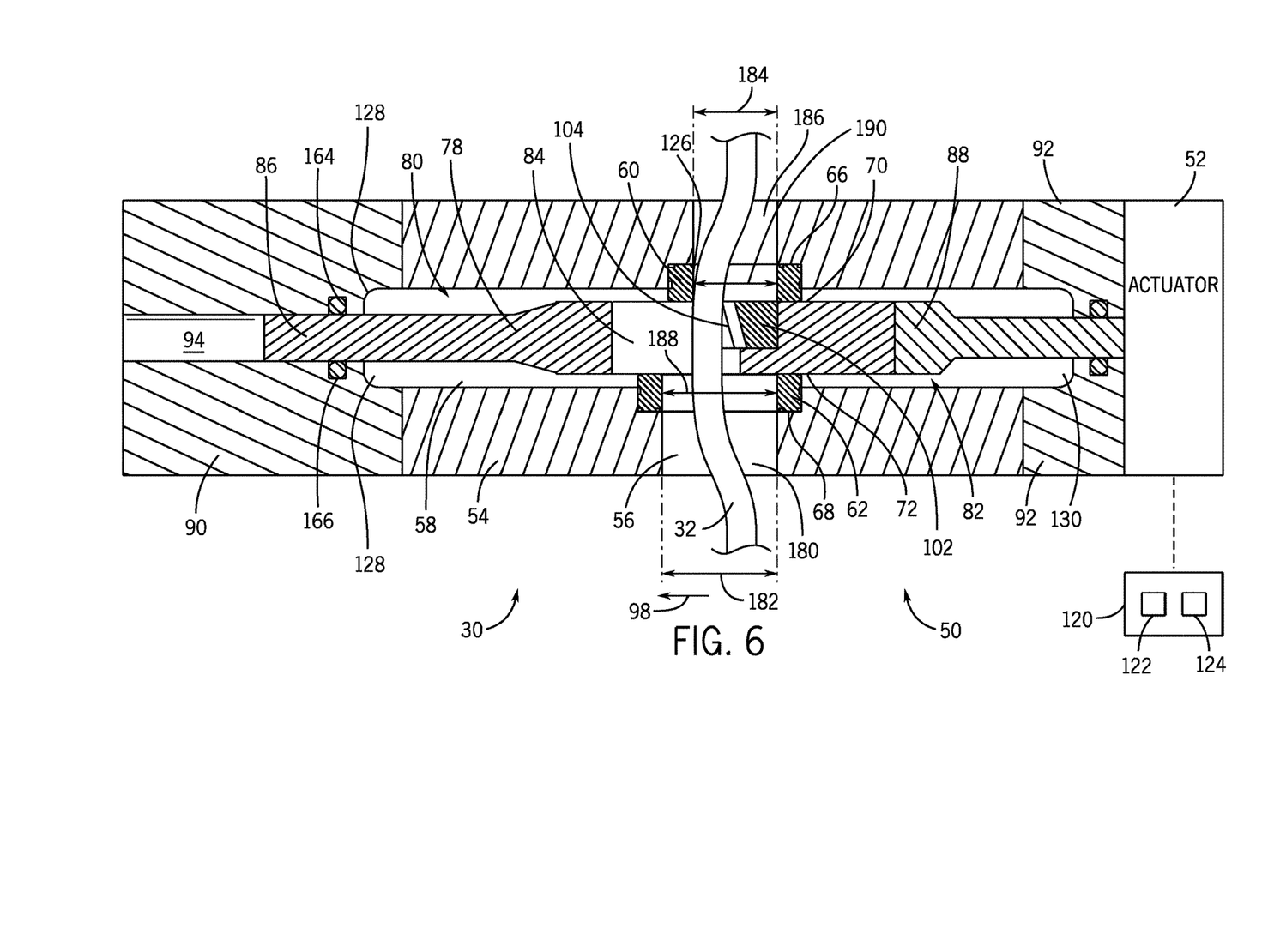
FIG. 6 is a cross-sectional view of an embodiment of a shearing gate valve system in a shearing position.

FIG. 6 is a cross-sectional view of an embodiment of a shearing gate valve system 30 in a shearing position. As illustrated, the first and second seats 60, 62 are closed seats (e.g., annular seats without open ends). However, the shearing gate valve system 30 still enables a single shear of the tubular 32 when closing the shearing gate valve 50. In order to shear the tubular 32 one time, the shearing gate valve 50 has an inlet 180 with a diameter 182 that is greater than a width 184 of an outlet 186. The larger diameter 182 of the inlet 180 enables the shearing gate valve 50 to use a second seat 62 with a diameter 188 that is larger than the diameter 190 of the first seat 60. Accordingly, as the actuator 52 drives the flow control element 64 in axial direction 98 the blade 102 contacts the tubular 32 and compresses the tubular 32 against the interior surface 126 of the first seat 60. However, because the second seat 62 has a diameter 188 that is larger than the diameter 190 of the first seat 60, the tubular 32 is not compressed against the second seat 62. Accordingly, neither the blade 102 nor the flow control element body 78 is able to compress and then shear the second tubing piece 142 against the second seat 62. The shearing gate valve 50 therefore only shears through the tubular 32 one time.

Figure 7:
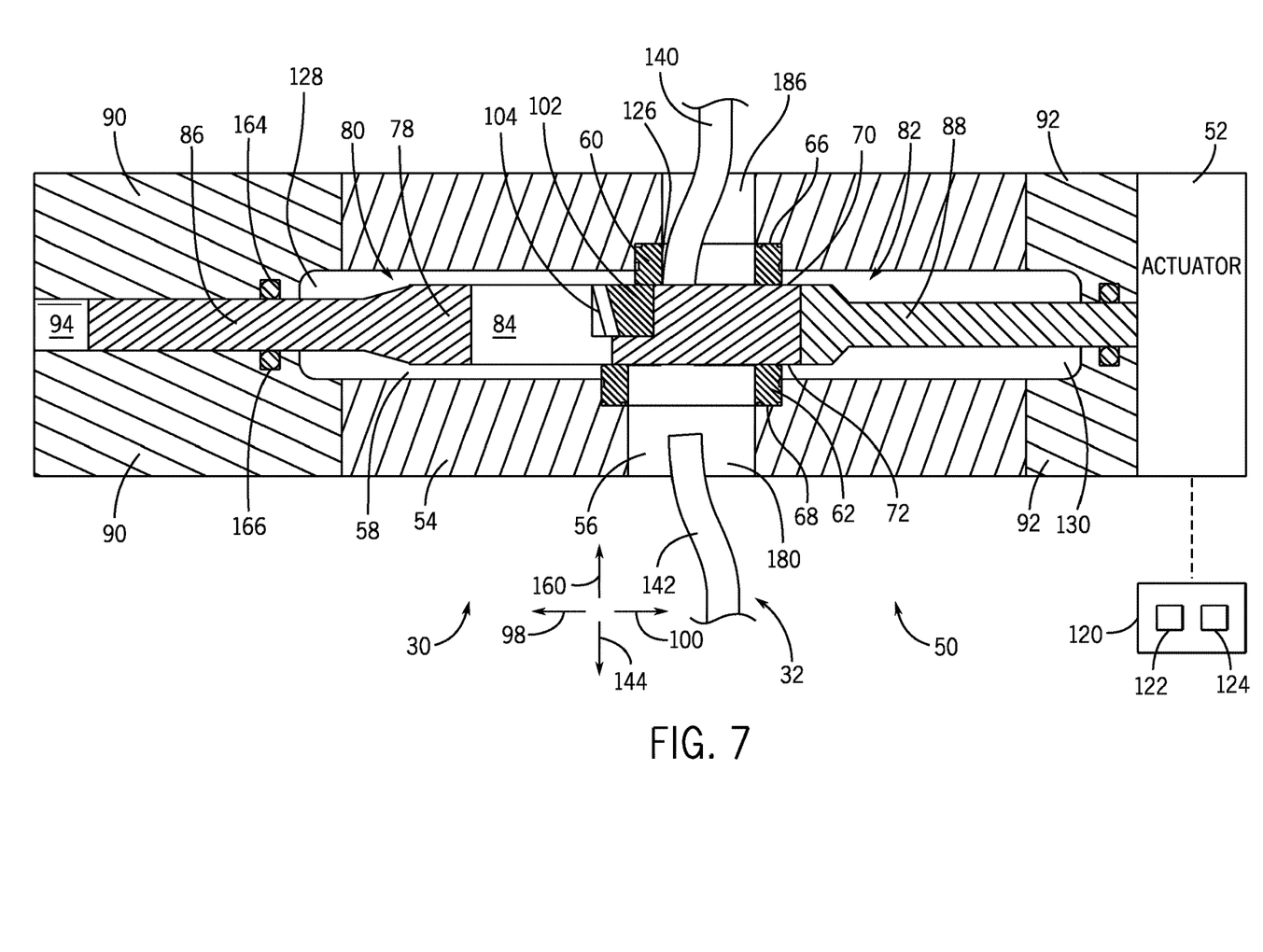
FIG. 7 is a cross-sectional view of an embodiment of a shearing gate valve system in a closed position.

FIG. 7 is a cross-sectional view of an embodiment of a shearing gate valve system 30 in a closed position. After cutting the tubular 32 into the first tubing piece 140 and the second tubing piece 142, the second tubing piece 142 is no longer supported/suspended and therefore falls into the wellhead 12 in axial direction 144. The actuator 52 continues to drive the flow control element 64 in axial direction 98 until the flow control element 64 covers the first seat 60. The pressure within the well 12 then forms a seal between the first seat 60 and the flow control element 64 of the shearing gate valve 50 by driving the flow control element 64 in axial direction 160. In other words, the pressure compresses the top surface 70 of the flow control element 64 against the bottom surface 162 of the second seat 62 to form a seal. In this position, the flow control element 64 blocks fluid flow through the shearing gate valve 50.

Figure 8:
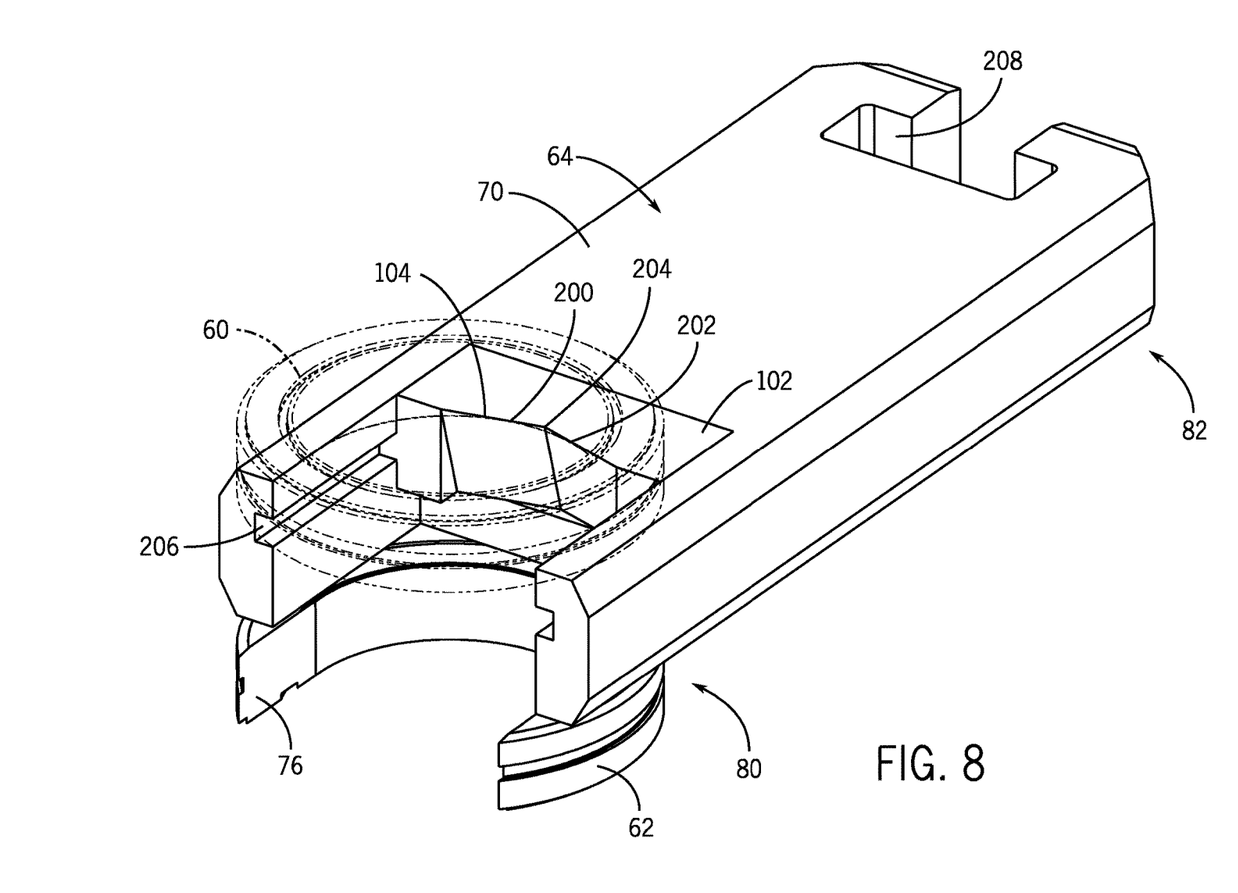
FIG. 8 is a perspective view of an embodiment of a flow control element and an open seat.

FIG. 8 is a perspective view of an embodiment of the flow control element 64 and the second seat 62. As explained above, the second seat 62 may be an open seat with an open end 76. In operation, the open end 76 blocks shearing of the tubular 32 in two places by the shearing gate valve system 30. As illustrated, the blade 102 includes the cutting edge 104 (e.g., knife-edge), which cuts the tubular 32. In some embodiments, the cutting edge 104 may be concave and/or have sloping sides that 200, 202 that angle inwards towards a center point 204 to capture and retain the tubular 32 against the cutting edge 104.

As explained above, the blade 102 may be part of the flow control element body 78 (e.g., integral, one-piece) or a separate component (e.g., an insert). FIG. 8 illustrates the blade 102 as an insert that couples to slots 206 (e.g., axial slots) on a first end 80 of the flow control element body 78. Although the slots 206 extend axially in the illustrated embodiments, it should be understood that the blade 102 may be coupled to the flow control element body 78 via any suitable fastener, key-fit interface, and/or slots having any suitable orientation, geometry. The slots 206 enable the interchangeability of blades 102 on the flow control element 64 for different cutting purposes. In other words, the blades 102 may be customized to cut different kinds of materials, thicknesses, etc. For example, the blades 102 may be customized by changing a material, a coating, and/or a shape of the cutting edge.

Opposite the first end 80, the flow control element 64 couples to the stem 88. In some embodiments, stem 88 may be a separate component that can be removably coupled to the flow control element 64. For example, the flow control element 64 may include a slot 208 (e.g., T-slot) that enables the stem 88 to couple to the flow control element 64. In some embodiments, the stem 88 may not be a separate element. In other words, the flow control element 64 and stem 88 may be one-piece or integral.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. A system, comprising:
a shearing gate valve system, comprising:
a shearing gate valve, comprising:
a stem configured to move axially;
a flow control element configured to couple to the stem and to move axially and block a flow of fluid through the shearing gate valve;
a cutting blade insert removably coupled to the flow control element and configured to shear a tubular member;
a first seat configured to form a seal with the flow control element to block the flow of fluid, the first seat configured to rest within a first counterbore; and
a second seat proximate an inlet configured to rest within a second counterbore, wherein the second seat comprises a non-annular structure with an open end configured to block the shearing gate valve from shearing the tubular member in two locations;
wherein the flow control element is between the cutting blade insert and the second seat to block contact between the cutting insert and the second seat.

2. The system of claim 1, wherein the tubular member is a wireline or tubing.

3. The system of claim 1, wherein the flow control element is a gate, the first seat is an annular seat supported within a first counterbore of a housing of the shearing gate valve between the flow control element and an outlet of the shearing gate valve when the shearing gate valve is in a closed position.

4. The system of claim 1, wherein the shearing gate valve system comprises an actuator configured to axially drive the flow control element in a first direction, and the cutting blade insert is configured to shear the tubular member as the flow control element moves in the first direction.

5. The system of claim 1, comprising a hydrocarbon extraction system with the shearing gate valve system, wherein the shearing gate valve system is configured to block a flow of hydrocarbons in an uncontrolled flow event.

6. The system of claim 1, wherein the flow control element is configured to move axially in a first direction to adjust the shearing gate valve from an open position in which the flow control element does not block the flow of fluid through the shearing gate valve to a closed position in which the flow control element blocks the flow of fluid through the shearing gate valve, the flow control element moves toward the open end of the second seat as the flow control element moves axially in the first direction, the cutting blade insert is configured to shear the tubular member as the flow control element moves axially in the first direction, and the first seat forms the seal with the flow control element while the shearing gate valve is in the closed position.

7. A system, comprising:
a shearing gate valve system, comprising:
a shearing gate valve, comprising:
a housing with an inlet and an outlet;
a flow control element configured to move axially in a first direction within the housing between an open position and a closed position, wherein the flow control element blocks a flow of fluid through the shearing gate valve;
a cutting blade coupled to the flow control element and configured to shear a tubular member as the flow control element moves axially in the first direction;
a first annular seat supported within a first counterbore of the housing proximate to the outlet;
a second seat proximate the inlet and supported within a second counterbore of the housing, wherein the second seat is a non-annular structure comprising an open end to block the shearing gate valve from shearing the tubular member in two locations, and wherein the flow control element moves toward the open end of the second seat as the flow control element moves axially in the first direction; and
wherein the first annular seat is configured to seal against the flow control element to block the flow of fluid through the shearing gate valve.

8. The system of claim 7, wherein the inlet has an inlet diameter and the outlet has an outlet diameter and wherein the inlet diameter is larger than the outlet diameter and is configured to block the shearing gate valve from shearing the tubular member in two locations.

9. The system of claim 7, wherein and the first annular seat and the second seat are positioned on opposite sides of the flow control element.

10. The system of claim 9, wherein the first annular seat comprises a first seat diameter and the second seat comprises a second seat diameter, and wherein the first seat diameter is smaller than the second seat diameter.

11. The system of claim 7, wherein the shearing gate valve system comprises an actuator configured to axially drive the flow control element, and a controller that controls the actuator.

12. The system of claim 7, comprising a hydrocarbon extraction system with the shearing gate valve system, wherein the shearing gate valve system is configured to block a flow of hydrocarbons in an uncontrolled flow event.

13. The system of claim 7, wherein the flow control element comprises a first surface facing the outlet and a second surface facing the inlet, the first annular seat is configured to seal against the first surface of the flow control element to block the flow of fluid through the shearing gate valve, and the cutting blade is aligned with the first surface of the flow control element to enable the cutting blade to shear the tubular member proximate to the first annular seat.

14. The system of claim 7, wherein at least one of the flow control element and the cutting blade coupled thereto are configured to compress the tubular member against the first annular seat, and the inlet is configured such that the tubular member is not compressed at the inlet while the tubular member is compressed against the first annular seat, thereby enabling the inlet to block the shearing gate valve from shearing the tubular member in two locations.

15. A method comprising:
actuating a shearing gate valve system with an actuator;
driving a flow control element axially in a first direction with the actuator to compress a tubular member against a first annular seat supported within a first counterbore of a housing of the shearing gate valve system proximate to an outlet of the shearing gate valve system;
shearing the tubular member at only one location with a blade as the flow control element moves axially in the first direction and over a second annular seat supported within a second counterbore of the housing of the shearing gate valve system, the second annular seat is a non-annular structure comprising an open end to block the shearing gate valve system from shearing the tubular member in two locations; and
forming a seal between the flow control element and the first annular seat to block a flow of fluid through the shearing gate valve system.

16. The method of claim 15, wherein the shearing gate valve system is configured to shear the tubular member only once by using an open seat or an inlet with a first diameter that is greater than a second diameter of the outlet.

17. The method of claim 15, wherein the tubular member is not compressed against a second seat supported within the second counterbore of the housing of the shearing gate valve system proximate to an inlet of the shearing gate valve system while the tubular member is compressed against the first annular seat, thereby facilitating shearing the tubular member at only one location with the blade.

* * * * *